June 2, 1964     D. J. SANTELER     3,135,108
METHOD AND APPARATUS FOR GAS ANALYSIS
Filed Dec. 29, 1960     2 Sheets-Sheet 1
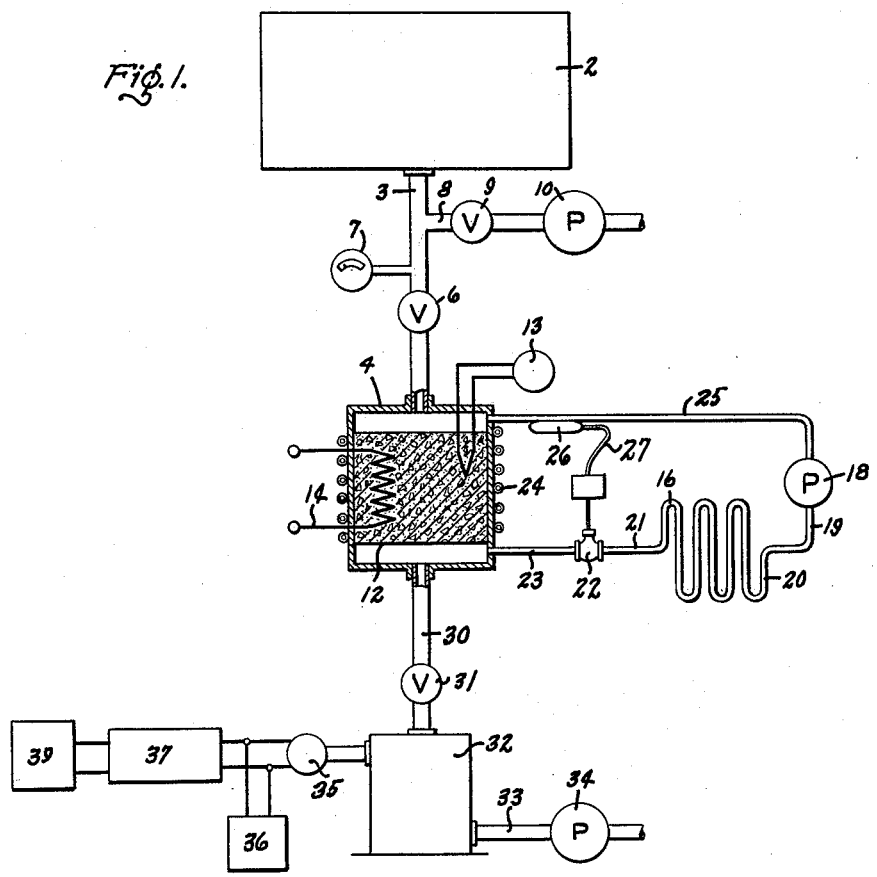
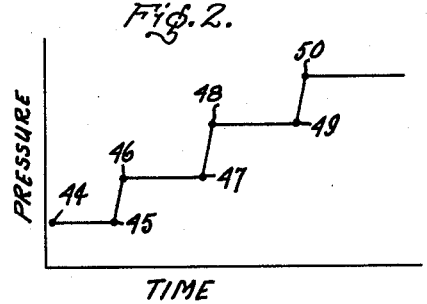
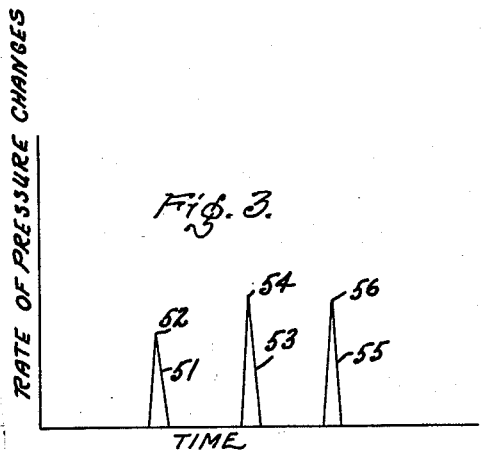
Inventor
Donald J. Santeler
by Paul A. Frank
His Attorney June 2, 1964   D. J. SANTELER   3,135,108
METHOD AND APPARATUS FOR GAS ANALYSIS
Filed Dec. 29, 1960   2 Sheets-Sheet 2
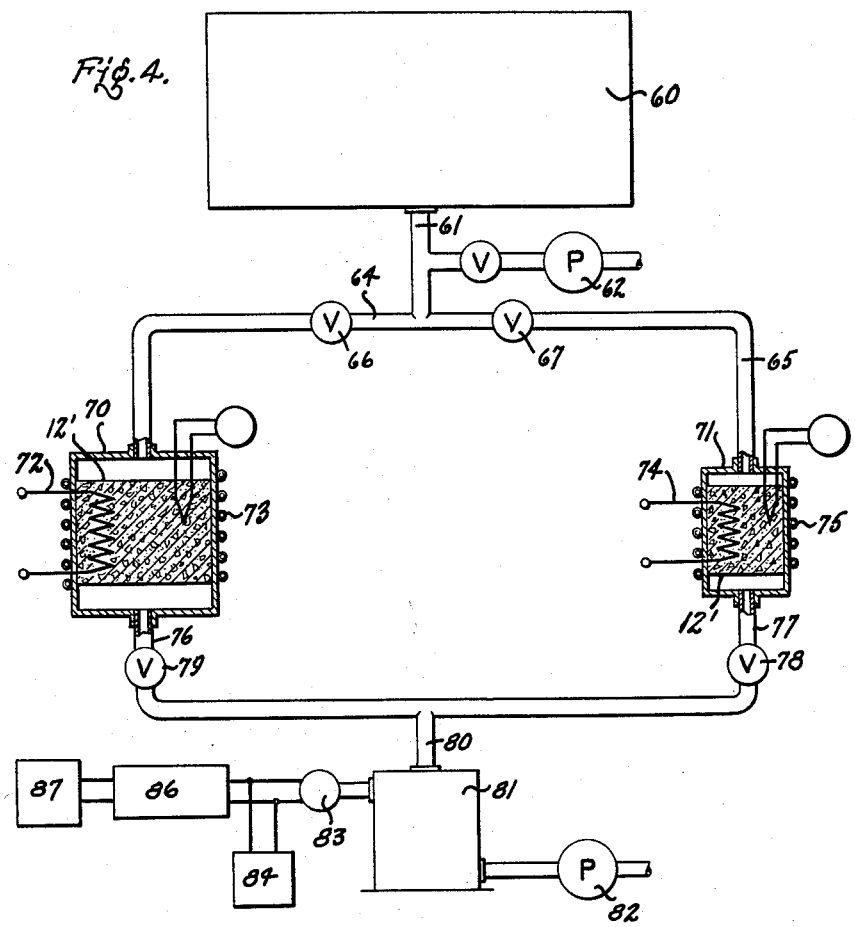
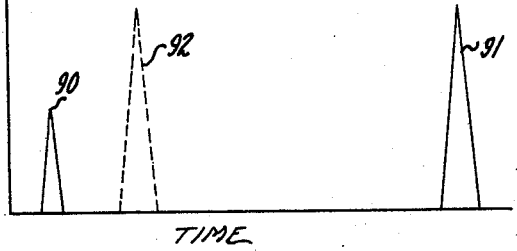
Inventor
Donald J. Santeler
by Paul A. Frank
His Attorney.

United States Patent Office 3,135,108
Patented June 2, 1964

3,135,108
METHOD AND APPARATUS FOR GAS ANALYSIS
Donald J. Santeler, Scotia, N.Y., assignor to General Electric Company, a corporation of New York
Filed Dec. 29, 1960, Ser. No. 79,252
7 Claims. (Cl. 73—23.1)

The present invention relates to a method and apparatus for analyzing gaseous mixtures and, more particularly, to a method and apparatus for analyzing low pressure gaseous mixtures.

In the manufacture of vacuum tubes, and in the use of space simulation chambers, vacuum furnaces, and similar equipment, it may be extremely important that the nature of gases in these low pressure environments be known. For example, the presence of oxygen or water vapor in minute quantities in certain apparatus can be especially harmful. Under such circumstances, gas analysis is usually performed by utilizing equipment such as mass spectrometers to determine the nature of the low pressure gaseous mixture in the equipment. Mass spectrometers in certain instances are beset with difficulties in discerning certain materials, since molecular weight is the basis upon which this particular apparatus functions. For example, at a molecular weight of approximately 28, nitrogen, carbon monoxide, and ethane may be sensed by a mass spectrometer without discrimination and as a result, more complicated means must be utilized to determine the makeup of the gaseous mixtures sensed at the particular molecular weight.

Another method for analyzing gases under such circumstances is by gas chromatography which utilizes the adsorption and thermal conduction of gaseous mixtures to determine the constituents thereof. Unfortunately, this method requires a carrier gas at a high pressure, for example, at atmospheric pressure mixed with the gas to be analyzed. The need for a high pressure carrier gas does not permit the use of this method of gas chromatography to be employed in the analysis of low pressure gaseous mixtures.

The chief object of the present invention is to provide an improved method and apparatus for gas analysis.

Another object of the invention is to provide an improved method and apparatus for analyzing low pressure gaseous mixtures.

A further object of the invention is to provide a method and apparatus for selectively sorbing constituent gases of a gaseous mixture to influence the partial pressures of the components of the gaseous mixture to permit the measurement of the discharge gas pressures from the sorbing area to be utilized for gas analysis.

These and other objects of my invention may be more readily perceived from the following description.

Briefly stated, the present invention is directed to a method and apparatus for gas analysis wherein a gaseous mixture is passed at a desired pressure into contact with a given quantity of a sorbing material whereby the material sorbs a portion of the gaseous mixture for a certain period of time. The non-sorbed gases at a lower pressure are discharged into an area remote from the sorbing material and the gas is analyzed by measuring transient pressure changes.

The attached drawings illustrate preferred embodiments of the invention in which:

FIGURE 1 is a schematic view of an apparatus for practicing the present invention;

FIGURE 2 is a diagram plotting pressure vs. time for the gas being discharged from the sorbing chamber of the apparatus in FIGURE 1;

FIGURE 3 is a diagram plotting changes in pressure vs. time of the gaseous mixture being discharged from the sorbing chamber illustrated in FIGURE 1;

FIGURE 4 is a schematic view of another embodiment of the apparatus shown in FIGURE 1; and, FIGURE 5 is a diagram plotting change in pressure vs. time for the gas being discharged from the apparatus illustrated in FIGURE 4.

In FIGURE 1 there is shown an apparatus for analyzing a gaseous mixture in accordance with the present invention. A gaseous mixture to be analyzed is located in chamber 2 which may be either a part of or associated with an apparatus, such as, a metallurgical still, cathode ray tube, or a space simulator in which it is desired to analyze the gaseous mixture. Chamber 2 is normally provided with pumping equipment such as conduit 8, valve 9, and pump 10. Usually, the pressure of the gaseous mixture is low, for example, $10^{-1}$ mm. of mercury and possibly as low as $10^{-7}$ mm. of mercury. The gas from chamber 2 is passed through conduit 3 to chamber 4. The flow of gas is controlled by means of valve 6. Suitable pressure measuring means 7 may be utilized to determine the pressure of the gas in conduit 8. The type of gas measuring means utilized may vary depending upon the range of pressures being measured, for example, with higher pressures a Bourdon gage may be utilized; where longer pressures are measured, an ionization gage may be utilized.

Chamber 4 has located therein a suitable sorbing material which reacts with one or more of the gases of the mixture being introduced therein. Well-known sorbing materials which may be utilized are charcoal, silica gel, glass and metal oxides. The nature of the sorbing material is dependent upon the gases generally known to be present in chamber 2. The sorption action may vary depending on circumstances. In certain instances adsorption is utilized and powdered or granular material such as powdered charcoal is supplied in a given quantity to chamber 4. In other situations, absorption may be utilized.

It is important to maintain a constant temperature in the sorbing chamber to maintain the validity of the analysis. To determine the temperature in chamber 4, suitable measurement means 13 may be provided. To maintain the temperature in chamber 4, suitable electrical heating means 14 and cooling means 16 may be utilized. The heating means may also be used to reactivate the sorbing material. In the present embodiment, the cooling means comprises a refrigeration system including a compressor 18, hot gas line 19, a condenser 20, a liquid line 21 connected to an expansion means such as a thermal expansion valve 22 through which a mixture of gaseous and liquid refrigerant is passed through line 23 to the evaporator 24 associated with chamber 4. The gaseous refrigerant is then recirculated through suction line 25 to compresser 18. When a thermal expansion valve is utilized in the refrigeration circuit, the operation thereof may be controlled by connecting valve 22 by means of capillary tube 27 to a temperature sensing means 26, the temperature sensing means 26 being in heat exchange relation with suction line 25 of the refrigeration circuit.

In practicing the present invention, it is desirable to discharge non-sorbed gases from chamber 4 into a lower pressure chamber 32 which is maintained at this pressure by means of a pump 34 connected to the chamber through line 33. Chamber 4 is connected to chamber 32 by means of conduit 30 having valve 31 located therein.

To perform a qualitative analysis of the gaseous mixture in chamber 2, suitable pressure measuring means 35 associated with a recorder 36 may be utilized. The nature of the pressure measuring means 35 is determined by the range of pressures being measured. Usually, this instrument will be similar to pressure measuring means 7 (Bourdon gage or ionization gage). According to the present invention a quantitative analysis of the gaseous components of the gaseous mixture may also be performed by determining the rate of changes of pressure in the gas being discharged from the area of sorption. Changes in pressure may be measured by instrument 35. If an ionization gage is used, the signal which is normally supplied to the recorder 36 may be passed to a suitable differentiating circuit 37 which measures rates of changes in pressure and supplies the information to recorder 39.

In the operation of the apparatus illustrated in FIGURE 1, a low pressure gas to be analyzed, for example, at a pressure of $10^{-1}$ mm. of mercury, is supplied through conduit 3 and valve 6 to chamber 4. It is desirable that the total pressure of this gas be maintained at a constant pressure during the analysis. The gaseous mixture is introduced into chamber 4 wherein a sorbing material such as charcoal is located. In the case of charcoal, adsorption of certain constituents of the gas occurs. The amount of charcoal present in chamber 4 is known and the adsorption quality thereof may be readily determined either by calculation or by test, in which case, the device may be calibrated. It is known that a given amount of sorbing material will unite with a given amount of certain constituent gases of the gaseous mixture at a given rate and that the sorptive action with a particular gas will continue until the qualities of the material have been exceeded for that gas. At which time, that particular component passes through chamber 4 without uniting with the sorbing material.

As previously mentioned, the analysis is performed at a desired pressure level and also it is desired to maintain a given temperature level since the sorbing qualities of the sorbent varies with temperature. To maintain temperatures, suitable electrical heating means 14 is provided and also suitable cooling means 16 which in the present embodiment is illustrated as a refrigeration system. It will be appreciated that in the event that extremely low temperatures are desired in chamber 4, other refrigerating means may be utilized, such as, expanding liquid nitrogen in the cooling coil which is in heat exchange relation with chamber 4.

The pressure of the gas supplied to chamber 4 is substantially determined by the sum of the partial pressures of the gases introduced therein. The pressure of gases being discharged into chamber 32 from chamber 4 is determined by the resistance to flow of the material in chamber 4, the speed of pump 34 and also the subtraction of portions of the gaseous mixture by sorption. In the latter case, the separate partial pressures of the gaseous constituents which are being sorbed are not sensed in chamber 32 until the sorptive qualities of material 12 have been exceeded for each sorbed gas specie at that temperature of chamber 4. At the time that such material no longer sorbs a particular constituent gas, the pressure in chamber 32 increases in an amount equal to the partial pressure of the particular constituent gas in the mixture. The change in pressure is shown by plotting pressure vs. time as illustrated in FIGURE 2, the pressure being sensed by pressure-sensing means 35 and recorded in recorder 36.

Initially, the pressure sensed in chamber 32 is that of non-sorbed gases at a pressure shown at 44 in FIGURE 2. At point 45, the sorbing action of the sorbent with a gas reaches a condition where the gas is no longer sorbed and the partial pressure of the gas is sensed in chamber 32. This increase in pressure is shown by the line between points 45 and 46. At point 46, a constant pressure condition exists until the next gas is no longer sorbed by material 12, in which case, the pressure increases from point 47 to 48. This phenomenon is repeated at point 49 to point 50 and again until no gases are sorbed. By determining, either by calculation or calibration, the time delay for different gases with different sorbing mediums, the time delays of these pressure changes can be used as an indication of the qualitative analysis of the gas mixtures. This relationship between sorbents and gases may be readily calculated considering that $P$=the partial pressure of a gas at the inlet to chamber 4 (mm. of mercury)
$C$=the conductance of the chamber (liter/sec.)
$S$=a particular gas solubility at the inlet partial of the gas (mm. of mercury liters/g.)
$G$=grams of sorbing material
$Q$=flow rate of component gas (mm. of mercury liters/sec.)
$A$=amount of gas sorbed (mm. of mercury liters)
$T$=time delay (sec.)

We, therefore, have the relationship $$Q=CP$$

and $$A=\frac{SG}{2}$$

assuming that Henry's law is valid and that molecular flow does exist.

The time delay is then $$T=\frac{A}{Q}=\frac{2}{2CP}$$

Assuming that for a given analysis the following constants exist $G$=100 grams absorbing material
$C$=0.5 liter/sec.
$P$=$10^{-2}$ mm. of mercury
$T$=10S sec.

Values for S may vary considerably with the gas, the sorbing material, and the temperatures at which sorption is performed. As an example, at a temperature of 15° C. and a pressure of $10^{-2}$ mm. of mercury, for charcoal the following values of S exist.

$CO_2$=0.068 mm. of mercury liters/g.
$N_2$=0.00027 mm. of mercury liters/g.
$O_2$=0.07 mm. of mercury liters/g.

At a temperature of $-183°$ C., the following values of S at $10^{-2}$ mm. of mercury for charcoal exist $N_2$=29 mm. of mercury × liters/g.
$CO_2$=59 mm. of mercury liters/g.
$H_2$=0.076 mm. of mercury liters/g.

In the case where values at 15° C. are utilized, the following time delays are experienced for charcoal:

$CO_2$=680 sec.
$N_2$=2.7 sec.
$O_2$=2,700 sec.

From the above time delays, it can be seen that the partial pressures of a gaseous mixture may be utilized to give the qualitative analysis of a gas or at least single constituents thereof.

If desired, it is also possible to utilize this particular apparatus for the quantitative analysis of the particular gaseous mixture. The quantitative analysis of the gas may be made by sensing the rate of changes in pressure with time. The time sequence indicating the particular gas being sensed is the same as that shown in FIGURE 2. The pressure change rate indicates the quantity of a particular gas in the gaseous mixture. In FIGURE 3, the rate of pressure changes are plotted against time for the gases plotted in FIGURE 2. The first curve 51 has a peak at 52, the second gas has a curve 53 with a peak at 54, and the third gas has a curve 55 with a peak at 56. These measurements are readily made by the pressure sensing device 35 in FIGURE 1 (which may be an ionization gage) and differentiating circuit 37 whose output signal may be plotted vs. time by recorder 39. Recorder 39 will supply a diagram similar to FIGURE 3. The peak measurements in FIGURE 3 may be readily calibrated into a quantitative analysis of certain constituent gases which make up the particular gas mixture being analyzed.

It will be appreciated that in certain instances, certain constituents of the gaseous mixture which are desired to be analyzed may not be sorbed by a particular sorptive material. In such an event, it is possible to supply a mixture of sorbing materials in chamber 4. The quantities of the different sorbing materials being fixed in such a manner that as the gaseous mixture is passed through a particular test chamber, the gas constituents are sorbed selectively by the different sorbing materials in a known time delay sequence. In this manner, many constituents of the gas mixture may be analyzed.

In certain situations, such as in the example given above wherein the nitrogen may not be sorbed by charcoal after 2.7 seconds and oxygen after 2700 seconds, it may be desired to modify the apparatus in the manner shown in FIGURE 4 so that the test may be expedited and the results achieved in a relatively short time. In FIGURE 4 gas is supplied from a chamber 60 through conduit 61 at a desired pressure maintained by pump 62. This gas may then be supplied through conduit 64 and conduit 65 to first and second chambers 70 and 71. The passage of gas to chamber 70 may be controlled by valve 66 and to chamber 71 by means of valve 67. Chamber 70 is of a large size having a large amount of sorbent 12', second chamber 71 has a much smaller quantity of sorbent 12'. It is also noted that chamber 70 is provided with heating means 72 and cooling means 73, and similarly chamber 71 is provided with heating means 74 and cooling means 75. The gases may be discharged from chamber 70 through line 76 and valve 79 to conduit 80 and similarly from chamber 71 through line 77 and valve 78 to conduit 80. Conduit 80 discharges into chamber 81 which is maintained at a lower pressure than chamber 60 by means of pump 82. The pressure is measured in chamber 81 by means of pressure sensing means 83 which is connected to a suitable recorder 84. Pressure change rates may be sensed by instrument 83 which may be an ionization gage whose output voltage is supplied to a suitable differentiating circuit 86 connected to a recording means 87. The differentiating circuit measures rate of changes in pressure and records such information on recorder 87.

In the operation of the apparatus illustrated in FIGURE 4, it is recognized that a particular mixture contains gases, some of which are sorbed almost instantaneously, in which case a large amount of sorbent material is required as shown in chamber 70 and other constituents of the gas require an extensive time to fully utilize the sorbing qualities of the sorbing material. For this purpose, a much smaller chamber 71 is provided having a comparatively small quantity of sorbing material.

In conducting an analysis with the apparatus in FIGURE 4, the gas may be initially supplied to chambers 70 and 71 by manipulating valves 66, 67, 79, and 78. After a predetermined time, the more rapidly sorbed material may be sensed as shown by curve 90 in FIGURE 5 which plots rate of pressure changes vs. time. This diagram which is similar to FIGURE 3 provides a quantitative and qualitative data concerning the material being analyzed. If only chamber 70 is utilized after an extended period of time, a signal generating curve 91 will be sensed. However, this period may be extremely long depending upon the sorbing material and the constituent gas. It may be highly undesirable to wait this length of time since a quick analysis is desired. For example, in the case of testing a cathode ray tube on a production line, a rapid analysis is desired. Under such circumstances, the test may be modified to give rapid results. The gaseous mixture is supplied to chamber 71 having a small quantity of sorbing material and the sorbing qualities of the material may be exceeded in a relatively short time as shown by dotted curve 92 in FIGURE 5. It is noted that this curve 92 is similar to 91, however, because of the smaller quantities of sorbing material utilized, the time delay is greatly reduced permitting a complete analysis after the data determining dotted curve 92 has been sensed.

The present invention provides a method and apparatus for testing the constituents, both quantitatively and qualitatively, of low pressure gas mixtures without incurring the difficulties of mass spectrometers wherein gases having substantially the same molecular weight are not readily discerned. The present apparatus is not only more precise in this aspect, but also less expensive since it requires only pressure sensitive devices such as ionization gages and associated instruments.

While I have described preferred embodiments of my invention, it will be understood that my invention is not limited thereto since it may be otherwise embodied within the scope of the following claims.

What I claim as new and desire to secure by Letters Patent of the United States is:

1. In a method for analyzing a low pressure gaseous mixture, the steps which consist in continuously passing the gaseous mixture is contact with a given quantity of sorbing material at conditions eventually exceeding capacity of the sorbing material to further sorb a constituent of the gaseous mixture, passing non-sorbed portions of the gaseous mixture into a lower pressure area, and measuring the pressure increase of the gaseous mixture when the constituent is no longer sorbed and also time delay therefor to identify the composition of said constituent.

2. In a method for analyzing a low pressure gaseous mixture, the steps which consist in continuously passing the gaseous mixture in contact with a given quantity of sorbing material at a predetermined pressure and temperature eventually exceeding capacity of the sorbing material to further sorb a constituent of the gaseous mixture, passing non-sorbed portions of the gaseous mixtures into a lower pressure area, and measuring the pressure increase of the gaseous mixture when the constituent is no longer sorbed and also time delay therefor to identify the composition of said constituent.

3. In a method for analyzing a low pressure gaseous mixture, the steps which consist in continuously passing the gaseous mixture in contact with given quantities of a plurality of sorbing materials at conditions eventually exceeding the capacity of said sorbing materials to further sorb constituents in the gaseous mixture, passing non-sorbed portions of the gaseous mixture into a lower pressure area, and measuring the time delay for pressure increase by the gaseous mixture when constituents are no longer sorbed to identify composition of constituents in the gaseous mixture.

4. In an apparatus for analyzing a low pressure gaseous mixture, the combination of a chamber, sorbing material of a given quantity located in said chamber, means for continuously supplying a gaseous mixture at a predetermined pressure through said chamber at conditions eventually exceeding capacity of the sorbing material to further sorb a constituent of the gaseous mixture, means for maintaining the chamber at a predetermined temperature, means for continuously discharging non-sorbed gases from the chamber, and means for sensing the pressure of the non-sorbed gases discharged from the chamber with time to identify composition of constituents in the gaseous mixture.

5. In an apparatus for analyzing a low pressure gaseous mixture, the combination of a chamber, a predetermined amount of sorbing material located in said chamber, means for continuously supplying a gaseous mixture at a predetermined pressure through said chamber at conditions eventually exceeding capacity of the sorbing material to further sorb a constituent of the gaseous mixture, means for heating said chamber, means for cooling said chamber, means for continuously discharging non-sorbed gases from said chamber, and means for sensing the pressure of the discharged non-sorbed gas from the chamber with time to identify composition of constituents in the gaseous mixture.

6. An apparatus for analyzing a low pressure gaseous mixture, the combination of a pair of chambers, said chambers containing different amounts of sorbing material, means for continuously supplying gaseous mixture through each of said chambers at conditions eventually exceeding capacity of the sorbing material to further sorb a constituent of the gaseous mixture, means for heating said chambers, means for cooling said chambers, means for continuously discharging gases from said chambers, and means for sensing the pressure of gaseous mixtures being passed from each of said chambers with time to identify composition of constituents in the gaseous mixture.

7. In an apparatus for analyzing low pressure gaseous mixtures, the combination of a pair of chambers, said chambers containing different amounts of sorbing material, means for continuously supplying the gaseous mixture through each of said chambers at a desired pressure but different flow rates, means for heating said chambers, means for cooling said chambers, means for continuously discharging non-sorbed gases from said chambers, and means for sensing the pressure of non-sorbed gases discharged from said chambers with time to identify the composition of constituents in said gaseous mixture.

References Cited in the file of this patent

Vapour Phase Chromatography by D. H. Desty; section by J. Janak; pp. 248 and 249 relied on; book published by Butterworth's Scientific Publications, London, U.S.A. Edition by Academic Press, Inc. New York.

Analytical Chemistry; "Two Stage Gas-Liquid Chromatography" by M. C. Simmons et al.; vol. 30, No. 1, January 1958, pp. 32–35 relied on.